(12) United States Patent (10) Patent No.: US 8,797,612 B2
Kubozono et al. (45) Date of Patent: Aug. 5, 2014

(54) SENSOR AND SENSOR CONTROL METHOD

(71) Applicant: Canon Kabushiki Kaisha, Tokyo (JP)

(72) Inventors: Kenji Kubozono, Kawasaki (JP);
Takahiro Ode, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/021,214

(22) Filed: Sep. 9, 2013

(65) Prior Publication Data

US 2014/0002871 A1    Jan. 2, 2014

Related U.S. Application Data

(63) Continuation of application No. 13/090,087, filed on Apr. 19, 2011, now Pat. No. 8,553,298.

(30) Foreign Application Priority Data

Apr. 27, 2010    (JP) ................. 2010-102519

(51) Int. Cl.
    *H04N 1/04*    (2006.01)
(52) U.S. Cl.
    USPC ............ 358/483; 358/482; 358/474; 358/498
(58) Field of Classification Search
    USPC ............ 358/483, 482, 474, 498, 497
    See application file for complete search history.

(56) References Cited

U.S. PATENT DOCUMENTS 6,300,615 B1 * 10/2001  Shinohara et al. ......... 250/214 R
7,312,825 B1 * 12/2007  Kuno et al. .................. 348/312

FOREIGN PATENT DOCUMENTS

| JP | H11-032166 A | 2/1999 |
| JP | 2002-354196 A | 12/2002 |
| JP | 2003-163788 A | 6/2003 |
| JP | 2007-074421 A | 3/2007 |
| JP | 2007-158500 A | 6/2007 |
| JP | 2009-060598 A | 3/2009 |

* cited by examiner

*Primary Examiner* — Houshang Safaipour
(74) *Attorney, Agent, or Firm* — Canon USA, Inc. IP Division

(57) ABSTRACT

A sensor includes a photoelectric conversion unit including a first photoelectric conversion element array and a second photoelectric conversion element array, each having an array of a plurality of photoelectric conversion elements arranged in a predetermined direction, a storage unit configured to store a charge generated by the photoelectric conversion unit, a transfer unit configured to transfer the charge generated by the photoelectric conversion unit to an outside of the sensor, a control unit configured to serially execute a first transfer control for transporting unit configured to transport a charge stored in the second photoelectric conversion element array to the transfer unit via the storage unit and a second transfer control for transporting unit configured to transport a charge stored in the first photoelectric conversion element array to the transfer unit via the second photoelectric element array and the storage unit.

19 Claims, 9 Drawing Sheets

US 8,797,612 B2

SENSOR AND SENSOR CONTROL METHOD

CROSS-REFERENCE TO RELATED APPLICATION

This application is a Continuation of U.S. application Ser. No. 13/090,087, filed Apr. 19, 2011, which claims priority from Japanese Patent Application No. 2010-102519 filed Apr. 27, 2010, which is hereby incorporated by reference herein in its entirety.

BACKGROUND OF THE INVENTION

1. Field of the Invention

The present invention relates to a sensor including a photoelectric conversion element and a method for controlling the sensor.

2. Description of the Related Art

Japanese Patent Application Laid-Open No. 2007-74421 discusses a sensor which includes a pixel array 1a, in which pixels that generate signal charges by photoelectric conversion are arranged, also includes a storage gate 3a, which stores a signal charge that has been generated in a pixel array.

In addition, Japanese Patent Application Laid-Open No. 2009-060598 discusses a method for executing a control for discharging an unnecessary charge, which has been stored on a charge storage unit configured to store a signal charge, to suppress an affect from the unnecessary charge.

While transferring a signal charge to the outside of a sensor, the charge storage unit stores a charge (signal charge) of an image. Accordingly, if the charge of the image is stored by the charge storage unit for a long time, a noise (dark current noise (charge)), which may occur due to the dark current, may be added to the signal charge. As a result, the noise may occur on the image signal input by the sensor. The noise is approximately proportional to the temperature and the storage time.

The method discussed in Japanese Patent Application Laid-Open No. 2009-060598 can discharge an unnecessary charge after a charge of an image is externally transferred but cannot discharge an unnecessary charge after a noise is added to an image by the charge storage unit.

SUMMARY OF THE INVENTION

The present invention is directed to a sensor and a sensor control method capable of solving the above-described problem.

According to an aspect of the present invention, a sensor includes a photoelectric conversion unit including a first photoelectric conversion element array and a second photoelectric conversion element array, each having an array of a plurality of photoelectric conversion elements arranged in a predetermined direction, a storage unit configured to store a charge generated by the photoelectric conversion unit, a transfer unit configured to transfer the charge generated by the photoelectric conversion unit to an outside of the sensor, a first transport unit configured to transport a charge stored in the first photoelectric conversion element array to the transfer unit via the storage unit, a second transport unit configured to transport a charge stored in the second photoelectric conversion element array to the first photoelectric conversion element array, and a control unit configured to serially execute a first transfer control for transferring the charge in the first photoelectric conversion element array by driving the first transport unit and the transfer unit according to a trigger signal, and a second transfer control for transferring a charge in the second photoelectric conversion element array to the outside of the sensor by driving the first transport unit, the second transport unit, and the transfer unit according to the trigger signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Figure 1:
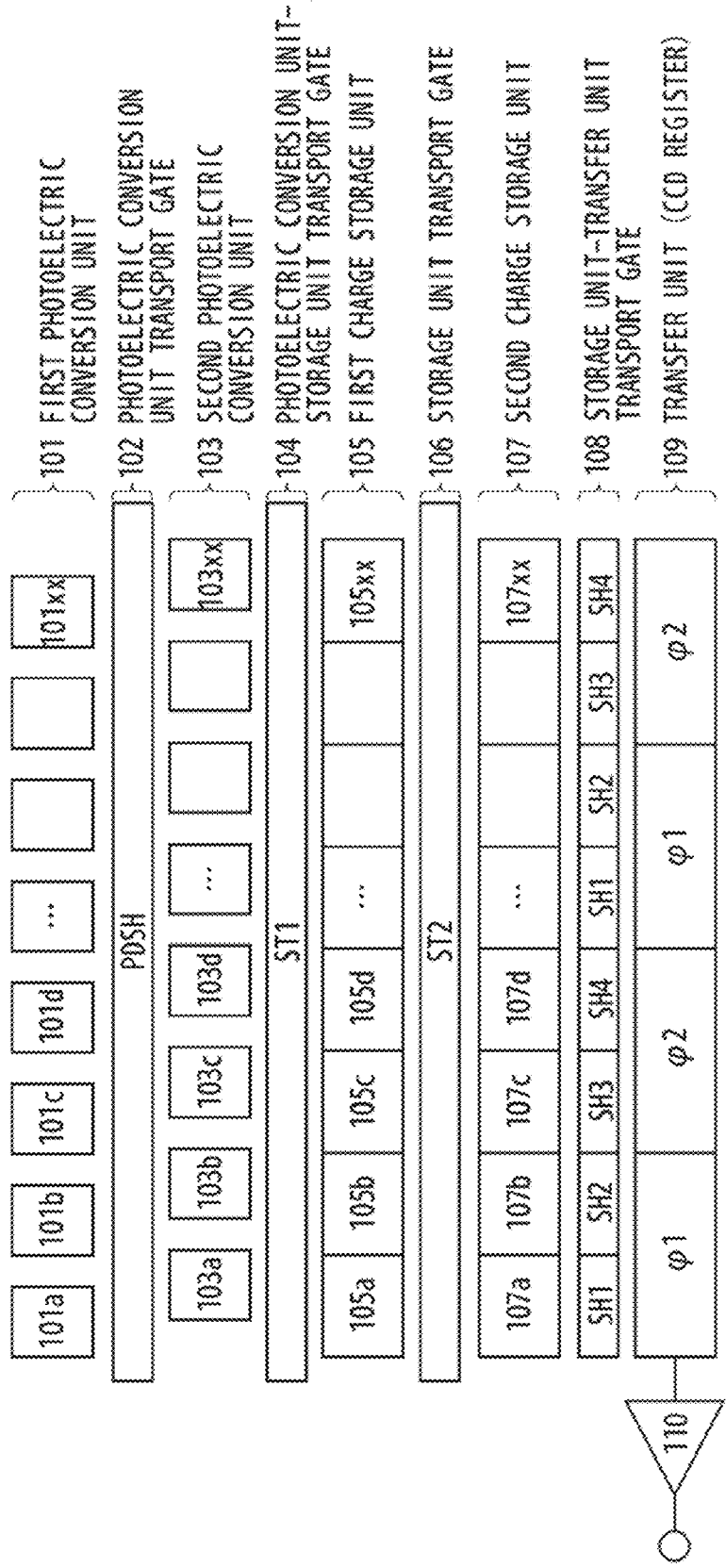
FIG. 1 illustrates an exemplary configuration of a sensor according to a first exemplary embodiment of the present invention.
Figure 2:
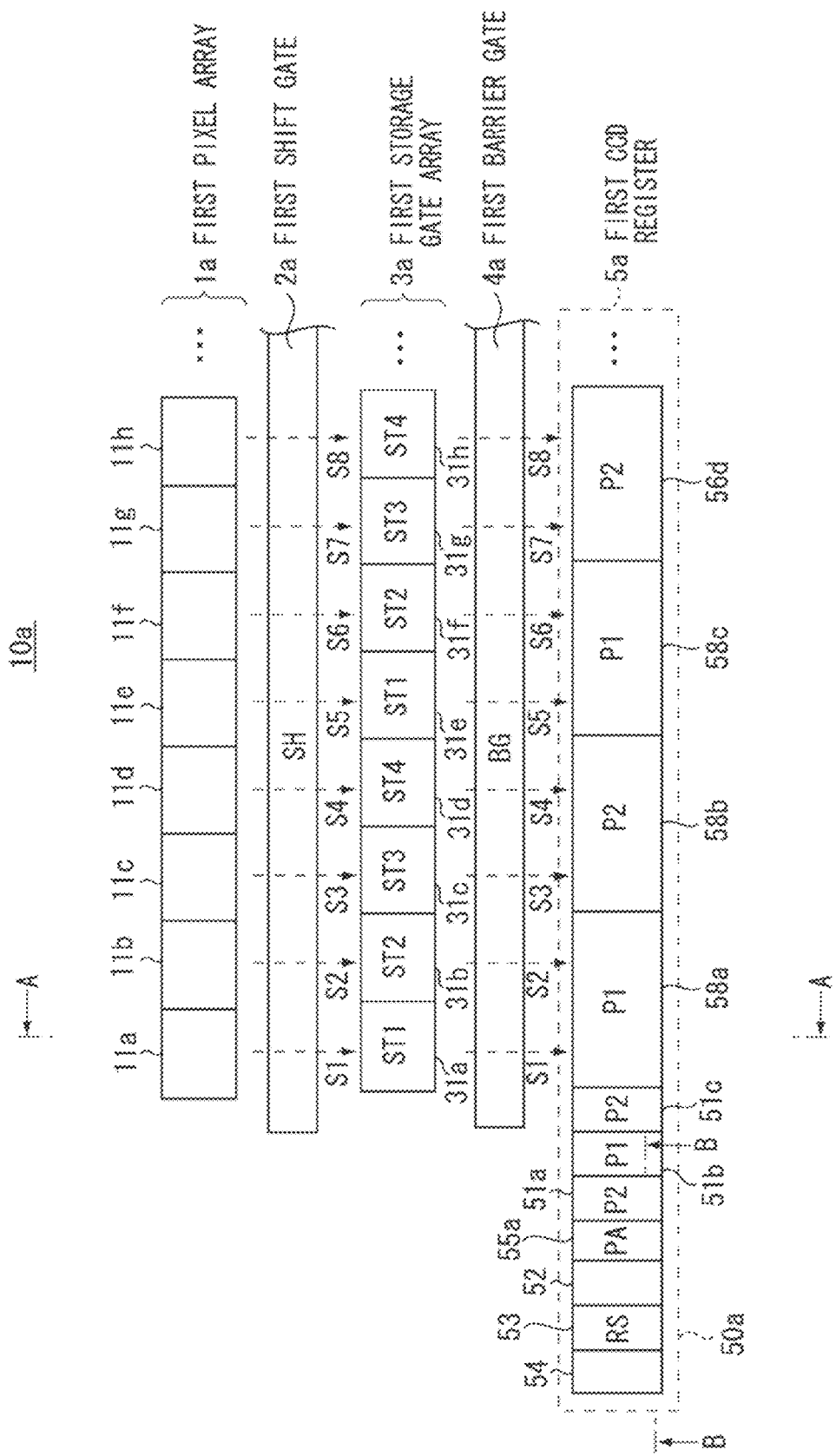
FIG. 2 illustrates a configuration of a conventional sensor.

FIG. 1 is a block diagram illustrating an exemplary configuration of a sensor according to a first exemplary embodiment of the present invention. Referring to FIG. 1, a first photoelectric conversion unit 101 includes an element array, in which a plurality of photoelectric conversion elements (101a through 101xx) is arranged as an array in a predetermined direction. Similarly, a second photoelectric conversion unit 103 includes an element array, in which a plurality of photoelectric conversion elements (103a through 103xx) is arranged as an array in a predetermined direction.

In each of a first charge storage unit (first storage unit) 105 and a second charge storage unit (second storage unit) 107, a plurality of charge storage portions (storage elements 105a through 105xx and 107a through 107xx), each of which stores a plurality of charges and which is arranged in a predetermined direction, is arranged as an array in a predetermined direction. Each of the first charge storage unit 105 and the second charge storage unit 107 includes a plurality of storage elements corresponding to the number of photoelectric conversion elements. A transfer unit 109 is a register that serially transfers charges. An output unit 110 is an output circuit that outputs the charges received from the transfer unit 109.

In addition, the sensor includes a transport unit that transports the charge. The transport unit includes a photoelectric conversion unit transport gate (first gate) 102, a photoelectric conversion unit-storage unit transport gate (second gate) 104, a storage unit transport gate (third gate) 106, and a storage unit-transfer unit transport gate (fourth gate) 108. Each of the gates transports the charge according to a signal, which will be described below.

An image can be read at a resolution of photoelectric conversion elements provided as an array by transferring a charge converted by each photoelectric conversion element of the first photoelectric conversion unit 101 and a charge converted by each photoelectric conversion element of the second photoelectric conversion unit 103, independently from each other, to an external image processing unit via a transport unit and a transfer unit. In the present invention, a mode for reading an image in the above-described manner is referred to as a "high resolution mode".

On the other hand, an image can be read at a resolution lower than the resolution of the photoelectric conversion element array by transferring charges of a plurality of photoelectric conversion elements in a lump in the unit of a plurality of photoelectric conversion elements arranged adjacent to each other among the photoelectric conversion elements included in the first photoelectric conversion unit 101, to an image processing unit 900a. In the present invention, a mode for reading an image in the above-described manner is referred to as a "low resolution mode".

For example, if the photoelectric conversion elements are arranged at 600 dots per inch (dpi), an image having a resolution of 600 dpi can be acquired in the high resolution mode. On the other hand, if an image is read in the low resolution mode, in which charges converted by two adjacently provided photoelectric conversion elements are transferred in a lump, an image having a resolution of 300 dpi can be acquired.

Figure 3:
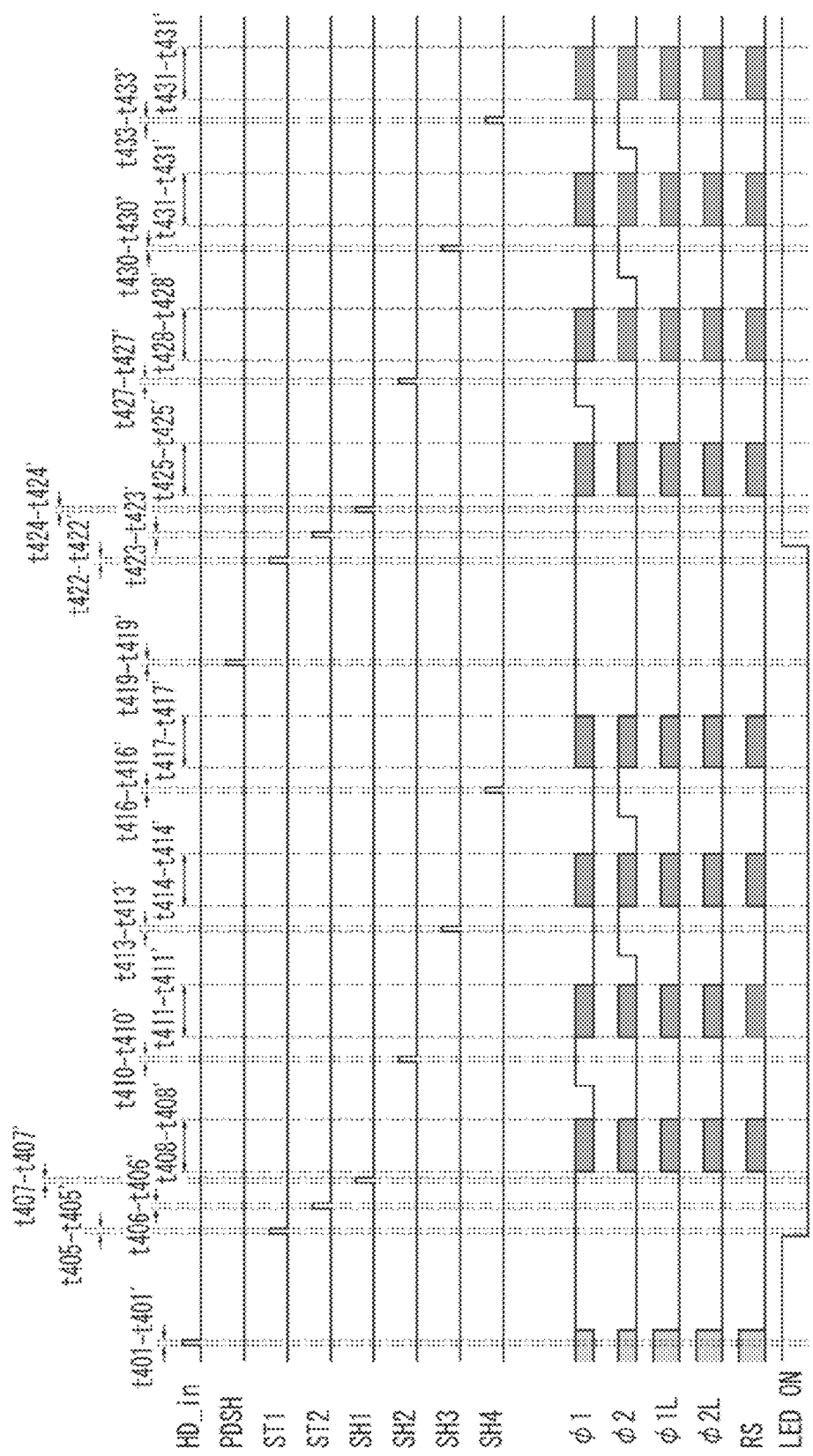
FIG. 3 is a timing chart illustrating an exemplary timing of the operation of the sensor according to the first exemplary embodiment.

A method for controlling the transfer of charges when an image is read in the high resolution mode will be described in detail below with reference to FIG. 3. Referring to FIG. 3, a signal "LED ON" corresponds to a state in which a sensor light source 903a is turned on at a "high" level and in which the sensor light source 903a is turned off at a "low" level.

In addition, the transfer unit 109 outputs the charge to the output circuit 110 according to signals φ1 and φ2. The output circuit 110 transfers the charge to an analog-to-digital (A/D) conversion circuit (an A/D conversion unit 903c illustrated in FIG. 9) according to signals φ1L and φ2L. The A/D conversion circuit converts an analog signal into a digital signal. Furthermore, the A/D conversion circuit transfers the digital signal to an image processing circuit (the image processing unit 900a illustrated in FIG. 9).

When the signal level of a signal HD_in reaches the "high" level during specific time (between timings t401 and t401'), reading on one line starts. When the signal level of the signal HD_in reaches the "high" level the next time, reading on the next one line starts. The signal HD_in is a signal generated as a scanner unit moves.

When the signal level of a signal ST1 reaches the "high" level between timings t405 and t405', the signal charge that has been stored on the second photoelectric conversion unit 103 is transported by the photoelectric conversion unit-storage unit transport gate (the second gate) 104 to the first charge storage unit 105. Furthermore, when the signal level of a signal ST2 reaches the "high" level between timings t406 and t406', the signal charge that has been stored on the first charge storage unit 105 is transported by the storage unit transport gate (the third gate) 106 to the second charge storage unit 107.

Moreover, when the signal level of a signal SH1 reaches the "high" level between timings t407 and t407', the charge stored on the storage element 107a of the second charge storage unit 107 is transported by the storage unit-transfer unit transport gate (the fourth gate) 108 to the transfer unit 109. On the other hand, when the signal level of a signal SH2 reaches the "high" level between timings t410 and t410', the charge is transported by the fourth gate 108 from the storage element 107b of the second charge storage unit 107 to the signal T2 of the transfer unit 109.

Subsequently, in the similar manner, when the signal level of a signal SH3 reaches the "high" level, the charge is transferred from the storage element 107c of the second charge storage unit 107 to the transfer unit 109. Furthermore, when the signal level of a signal SH4 reaches the "high" level, the charge is transported from the storage element 107d of the second charge storage unit 107 to the transfer unit 109. In the above-described manner, the present exemplary embodiment executes a transfer control for transporting and transferring the signal charge stored on the second photoelectric conversion unit 103.

Now, a transfer control for transporting and transferring a signal charge stored on the first photoelectric conversion unit 101 will be described in detail below.

When the signal level of a signal PDSH reaches the "high" level between timings t419 and t419', the charge stored on the first photoelectric conversion unit 101 is transported by the photoelectric conversion unit transport gate (the first gate) 102 to the second photoelectric conversion unit 103. Furthermore, when the signal level of a signal ST1 reaches the "high" level between timings t422 and t422', the charge in the second photoelectric conversion unit 103 is transported to the first charge storage unit 105.

Subsequently, similar to the control for transporting and transferring the charge from the second photoelectric conversion unit 103, the charges are transported according to the change of the level of each of the signals ST2 and SH1 through SH4. After transferring the charge between timings t431 and t431', when the signal level of the signal HD_in reaches the "high" level, charges of the next one line are transported.

The signal "LED ON" is controlled to turn off the light source during time in which the signal charge is stored by at least one of the first photoelectric conversion unit 101 and the second photoelectric conversion unit 103.

More specifically, the light source is controlled to be off until the signal level of the signal ST1 reaches the "high" level between timings t422 and t422' and until the charge stored on the first photoelectric conversion unit 101 is transported to the first charge storage unit 105. In addition, in order to read the next line, the storage unit-transfer unit transport gate 108 and the transfer unit 109 are driven during time after the light source has been turned on (between timings t425 and t431') to transfer the signal charge of the previous one line.

Figure 5:
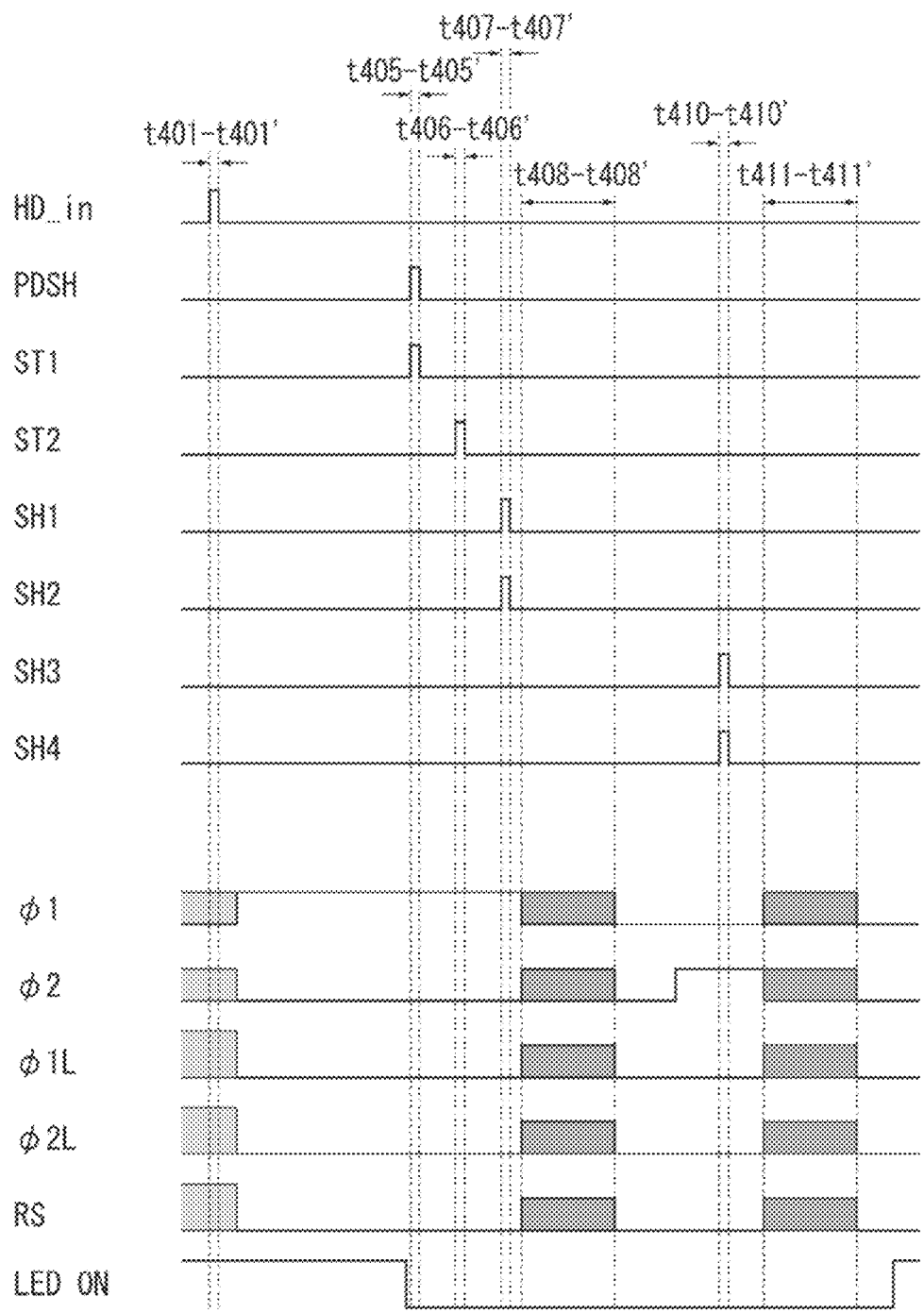
FIG. 5 is a timing chart illustrating an exemplary timing of the operation of the sensor according to the first exemplary embodiment.

Now, a control for transferring a charge in executing reading in the low resolution mode will be described in detail below with reference to FIG. 5. In the following description, the description of the same control as that described above with reference to FIG. 3 will not be repeated.

When the signal level of the signal HD_in reaches the "high" level during specific time (between timings t401 and t401'), reading on one line starts. Furthermore, when the signal levels of the signal PDSH and the signal ST1 reach the "high" level between timings t405 and t405', the signal charges stored on the first photoelectric conversion unit 101 and the second photoelectric conversion unit 103 are transported to the first charge storage unit 105. Moreover, when the signal level of the signal ST2 reaches the "high" level between timings t406 and t406', the charge stored on the first charge storage unit 105 is transported to the second charge storage unit 107.

Furthermore, when the signal levels of the signal SH1 and SH2 reach the "high" level between timings t407 and t407', the charges stored on the storage elements 107a and 107b of the second charge storage unit 107 are transported to the transfer unit 109. In addition, when the signal levels of the signals SH3 and SH4 reach the "high" level between timings t410 and t410', the charges are transported from the storage elements 107c and 107d of the second charge storage unit 107 to the transfer unit 109.

As described above, in controlling the transfer of charges during the reading with the high resolution, the time for storing the charges from the first photoelectric conversion unit 101 on the first charge storage unit 105 and the second charge storage unit 107 is controlled to become as short as possible. In addition, the charge generated by the first photoelectric conversion unit 101 is controlled to be stored on the first photoelectric conversion unit 101 until the timing at which the charges can be transferred to the transfer unit 109 comes.

To paraphrase this, the difference between the time for temporarily holding the charge, which has been stored on the first photoelectric conversion unit 101, on the first charge storage unit 105 and the second charge storage unit 107 during the transport thereof to the transfer unit 109 and the time for temporarily holding the charge, which has been stored on the second photoelectric conversion unit 103, on the first charge storage unit 105 and the second charge storage unit 107 during the transport thereof to the transfer unit 109 is controlled to be small (or the lengths of the above-described time are controlled to be the same as each other).

With the above-described configuration, the present exemplary embodiment can suppress or prevent unevenness that may otherwise occur on an image to be read and possible degradation of the quality of the image to be read by controlling the quantity of the charges stored on the first photoelectric conversion unit 101 and the quantity of the charges stored on the second photoelectric conversion unit 103 to be the same as each other.

Figure 6:
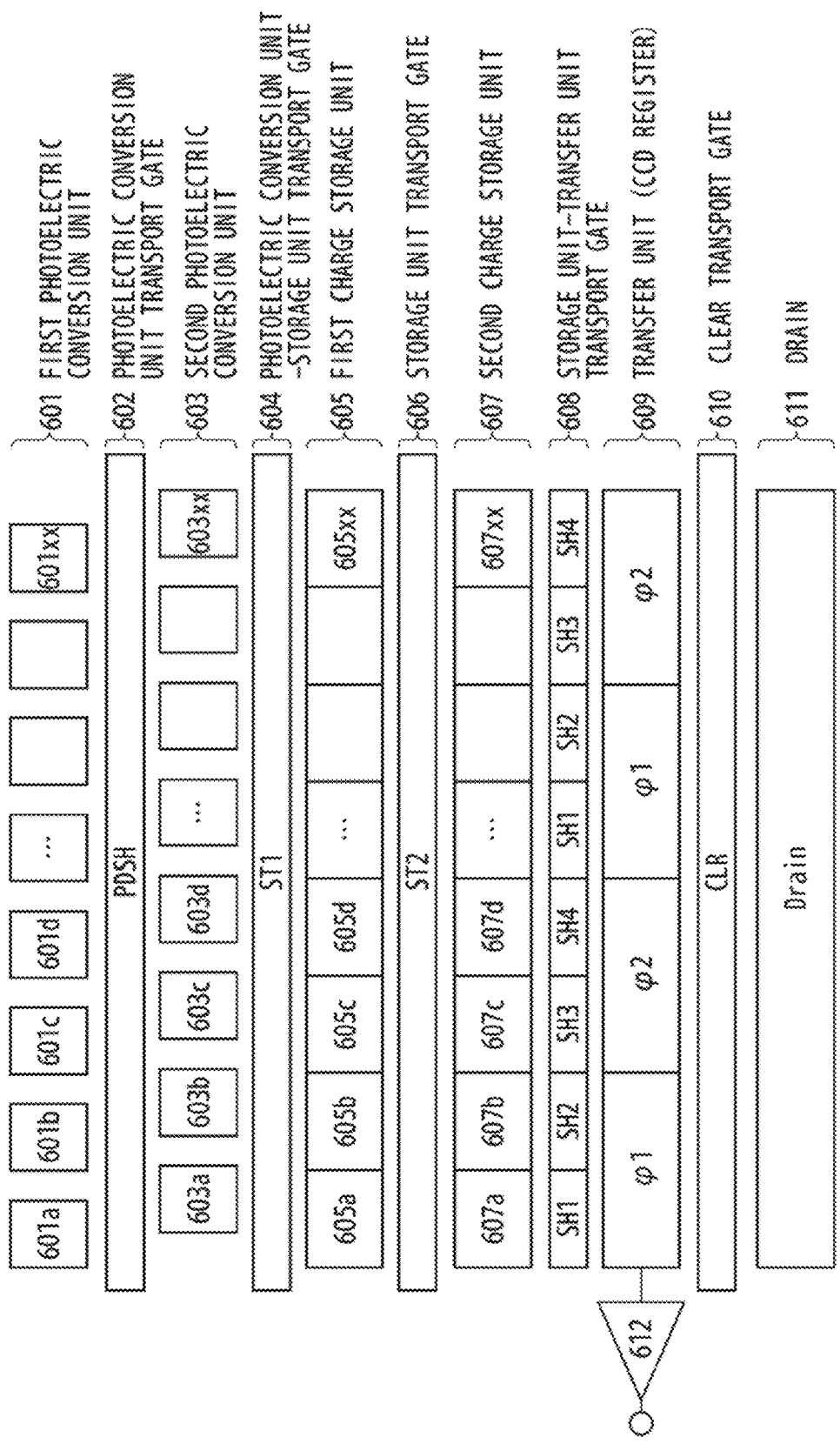
FIG. 6 illustrates an exemplary configuration of a sensor according to a second exemplary embodiment of the present invention.

FIG. 6 is a block diagram illustrating an exemplary configuration of a sensor according to a second exemplary embodiment of the present invention, which includes a photoelectric conversion element. The descriptions of similar configuration to that illustrated in FIG. 1 is omitted, and only different points are described below.

Referring to FIG. 6, the sensor includes a drain (an unnecessary charge elimination unit or an unnecessary charge discharge unit) 611 configured to discharge an unnecessary charge that has been generated on a transfer unit 609. In addition, the sensor includes a clear transport gate (fifth gate) 601 that transports the charge in the transfer unit 609 to the drain 611.

With the above-described configuration, the present exemplary embodiment controls the unnecessary charge not to be output to the image processing unit 900a together with the signal charge by transferring the unnecessary charge to the drain 611 after the signal charge is transferred to the image processing unit 900a.

Now, an exemplary control for transferring the charge executed in reading with the high resolution will be described in detail below with reference to FIG. 7. The description of the same control illustrated in FIG. 7 as the control described above with reference to FIG. 3 will not be repeated here. In the following description, points in difference from the configuration described above with reference to FIG. 3 only will be described.

When the signal level of the signal HD_in reaches the "high" level during specific time (between timings t701 and t701'), reading on one line starts.

In addition, when the signal level of the signal ST2 reaches the "high" level between timings t702 and t702', the unnecessary charge that has been stored on a first charge storage unit 605 is transported to a second charge storage unit 607. Subsequently, when the signal levels of the signals SH1 and SH3 reach the "high" level between timings t703 and t703', the unnecessary charges that have been stored on the second charge storage units 607a, 607c, . . . , and 607xx–1 and on the transfer unit 609 are transferred to the drain 611. The unnecessary charges that have been transferred to the drain 611 are discharged.

Figure 7:
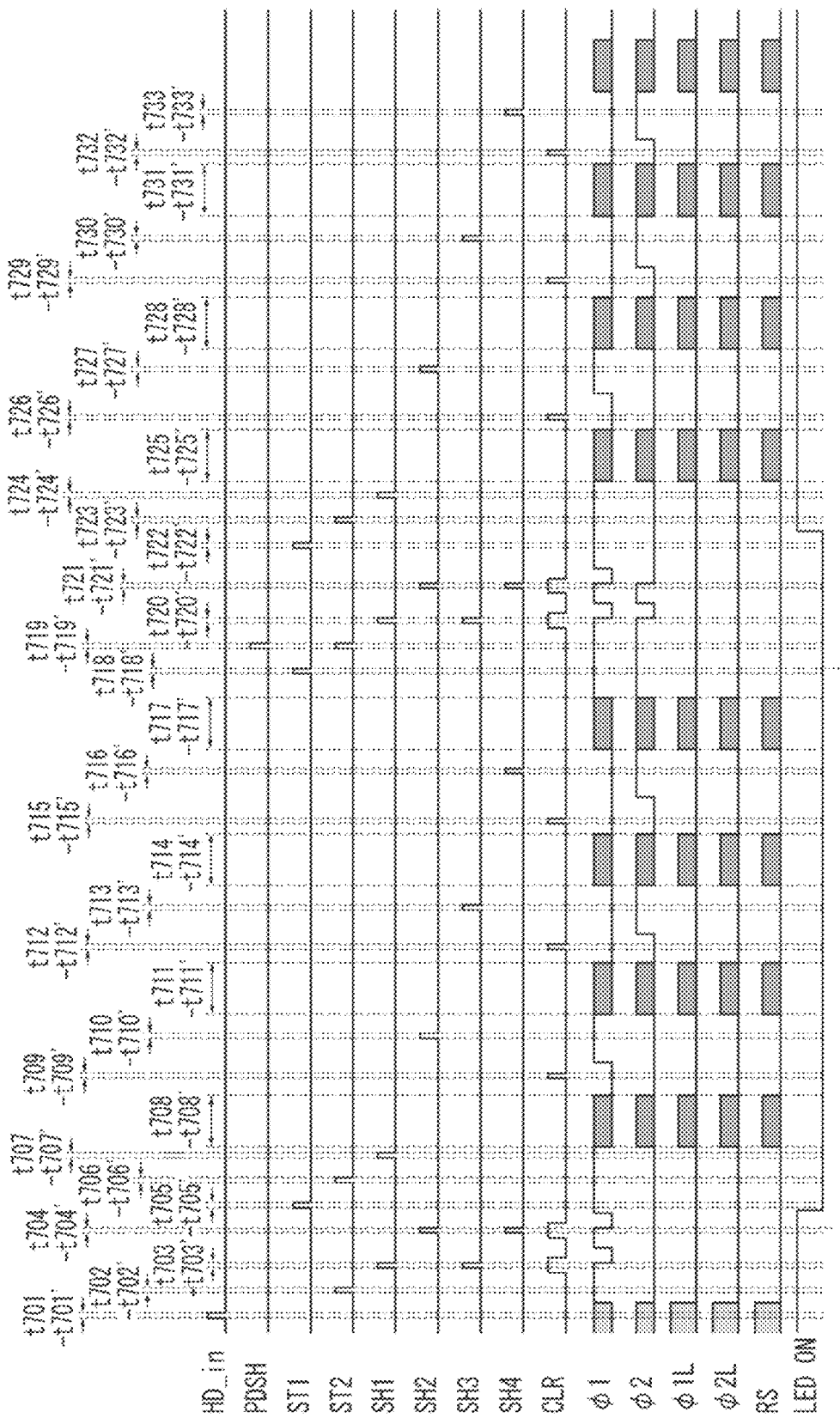
FIG. 7 is a timing chart illustrating an exemplary timing of the operation of the sensor according to the second exemplary embodiment.
Figure 8:
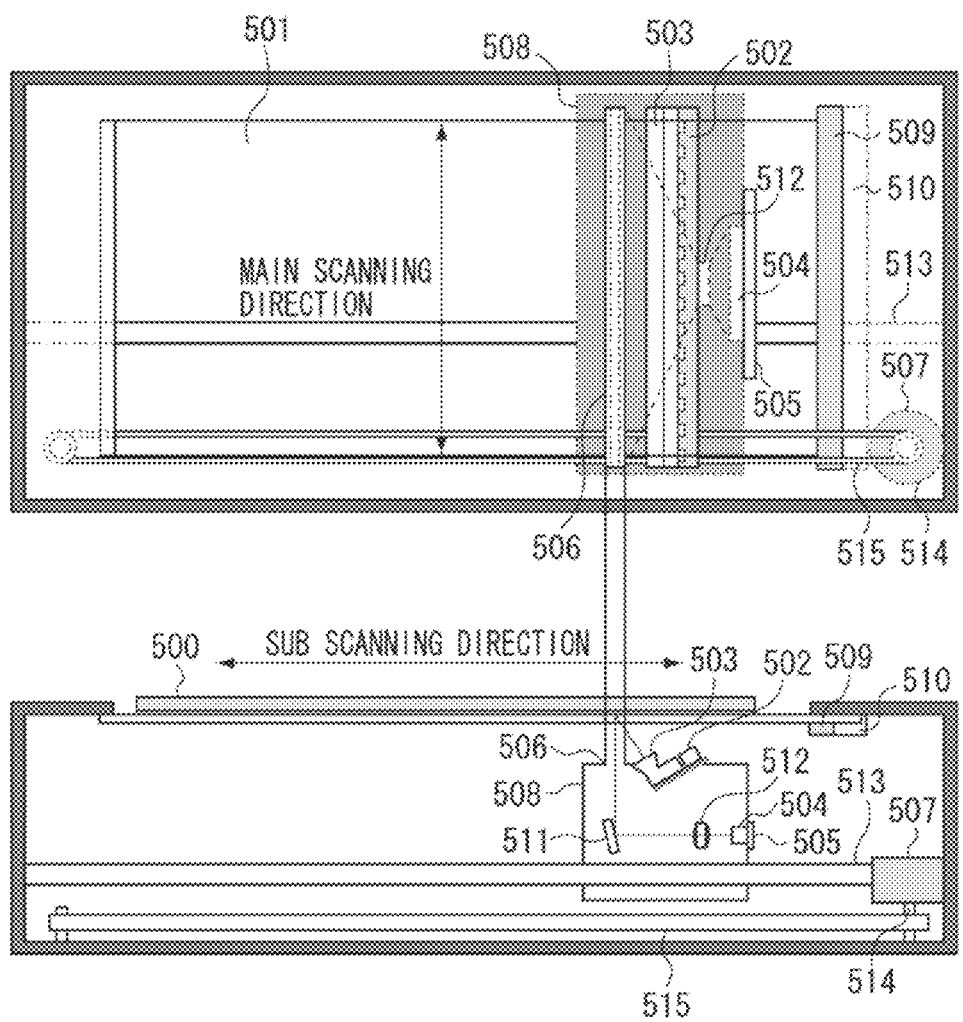
FIG. 8 is a plan view and a cross section of an image reading apparatus.

For the processing, as illustrated in FIG. 7, the signal level of a signal CLR is controlled to reach the "high" level before the timing t703. In addition, the signal level of the signal CLR is controlled to reach the "low" level after the timing t703'. Furthermore, the signal level of the signal T1 is switched from the "high" level to the "low" level at the timing t703'.

In addition, when the signal levels of the signals SH2 and SH4 reach "high" between timings t704 and t704', the unnecessary charges that have been stored on the second charge storage units 607b, 607d, . . . , and 607xx and on the transfer unit 609 are transferred to the drain 611. The unnecessary charges that have been transferred to the drain 611 are discharged.

For the processing, as illustrated in FIG. 7, the signal level of the signal CLR is controlled to reach the "high" level before the timing t703. In addition, the signal level of the signal CLR is controlled to reach the "low" level after the timing t703'. Furthermore, the signal level of the signal T1 is switched from the "high" level to the "low" level.

In addition, when the signal level of the signal ST1 reaches the "high" level between timings t705 and t705', the signal charge that has been stored on a second photoelectric conversion unit 603 is transported to the first charge storage unit 605. After that, until a timing t717', the transport control similar to the transport control described above in the first exemplary embodiment is executed. Accordingly, the control executed until the timing t717' will not be repeated here.

Now, the control executed at a timing t718 and beyond will be described in detail below. When the signal level of the signal ST1 reaches the "high" level between timings t718 and t718', the unnecessary charge that has been stored on the second photoelectric conversion unit 603 is transported to the first charge storage unit 605. Subsequently, between timings t719 and t722, the same processing as the processing executed between timings t702 and t705' is executed. The signal levels of the signals PDSH and ST2 are controlled to reach the "high" level between timings t719 and t719'.

The control executed at a timing t722 and beyond will be described. When the signal level of the signal ST1 reaches the "high" level between timings t722 and t722', the signal charge that has been stored on the second photoelectric conversion unit 603 is transported to the first charge storage unit 605. After that, the same transfer control as the control between timings t706 and t717' is executed. Accordingly, the detailed description thereof will not be repeated here.

<Description of the Multifunction Printer>

Figure 4:
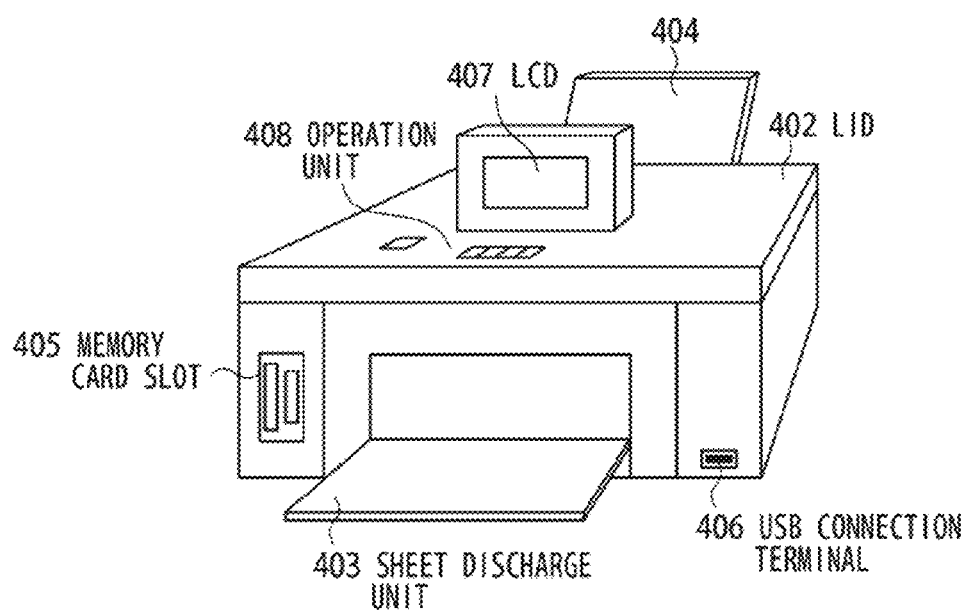
FIG. 4 is a perspective view of a multifunction printer.

FIG. 4 is an external front view of a multifunction printer (hereinafter simply referred to as an MFP) 401. The MFP 401 includes an image reading apparatus which has a linear sensor having the configuration described above. The MFP 401 includes a recording unit (recording apparatus) and a scanner unit (reading apparatus). The recording unit includes an inkjet printer. The scanner unit includes a flatbed scanner, to which a charge-coupled device (CCD) linear sensor is mounted.

For the structure of the MFP 401, the scanner unit is provided above the recording unit. The scanner unit includes a lid 402, which can be used to press a document having an image to be read downwards. The lid 402 can pivot (open and close) with a hinge (not illustrated). In addition, the recording unit includes a paper discharge unit 403 and a paper feed unit 404. The paper discharge unit 403 discharges a recording medium having an image recorded thereon outside the MFP 401. The paper feed unit 404 can stack a recording medium, such as a recording sheet, which is used in recording an image thereon.

In addition, a memory card slot 405 is provided on the front surface of the MFP 401. The memory card slot 405 is used to mount a memory card, which is used on a digital camera or a personal computer (PC), to the MFP 401. Two types of slots are provided to the memory card slot 405. Furthermore, on the front surface of the MFP 401, a USB connection terminal (i.e., external device contact terminal) 406, which is a terminal for connecting to a digital camera and an external storage device, is provided. In addition, the MFP 401 includes an operation unit 408, which has a plurality of operation buttons. Furthermore, the MFP 401 includes a display unit (liquid crystal display (LCD)) 407. The display unit 407 displays a menu and a screen.

Now, the scanner unit will be described in detail below with reference to FIG. 5. FIG. 5 is a top view and a side view of the scanner unit. The scanner unit includes a glass document plate 501, on which a document is to be set, and a carriage 508. The carriage 508 moves in the sub scanning direction along a shaft 513. A carriage motor 507 is a drive source of the scanner carriage 508.

In addition, the scanner carriage 508 includes a light source light-emitting diode (LED) 502, which irradiates the document with light, a light guide member 503, which guides the light emitted from the light source LED 502 onto a document 500, and a mirror 511 and a lens 512, which guide the light reflected from the document 500 to a sensor 504.

<Structure of MFP Related to Control>

Figure 9:
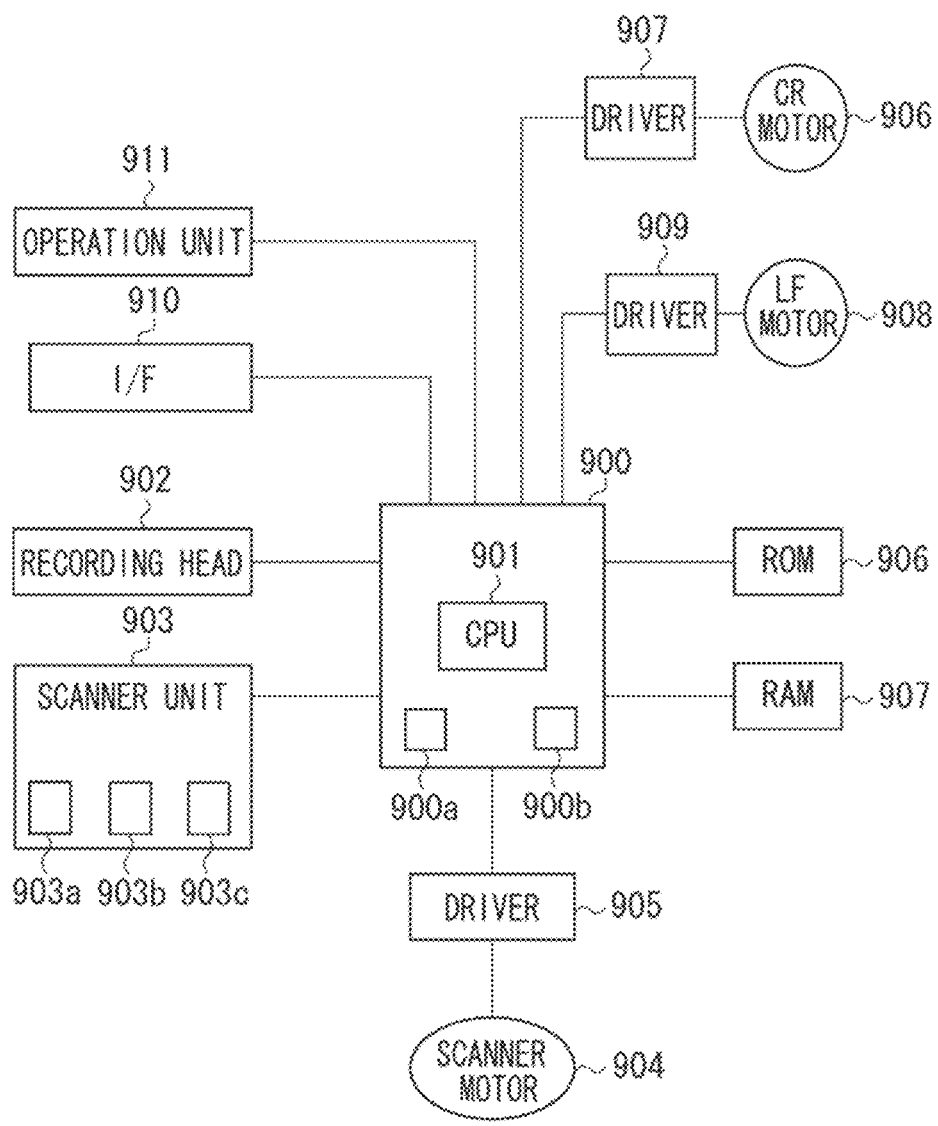
FIG. 9 illustrates an exemplary control block of the multifunction printer.

FIG. 9 illustrates exemplary control blocks of the MFP 401.

Referring to FIG. 9, a controller 900 includes a CPU 901. The CPU 901 controls the recording unit (recording apparatus) and the scanner unit (reading apparatus). More specifically, the controller 900 controls the driving of the recording head 902, the scanner unit 903, and each of motors (scanner motor 904, CR motor 906, and LF motor 908).

The CPU 901 executes the above-described control according to a control program and a data table stored on a read-only memory (ROM) 906. A RAM 907 includes a work RAM used by the CPU 901. The CPU 901 executes the control according to a signal received from an operation unit 908 and an interface 909.

The CPU 901 executes the control of the scanner unit (the reading apparatus) in the high resolution mode or the low resolution mode. The controller 900 transfers various types of signals to the scanner unit 903. A digital image signal is input by the scanner unit 903. Furthermore, the controller 900 includes the image processing unit 900a, which executes image processing on the input image signal.

The controller 900 includes a signal generation unit 900b, which is configured to generate a signal for controlling the operation of the sensor (for example, a trigger signal HDin). After data is subjected to the image processing by the image processing unit 900a, the image-processed data is stored on a memory. In addition, the controller 900 includes a recording data generation unit that generates data to be recorded, which is to be output to a recording head.

The scanner unit 903 includes a signal generation circuit (not illustrated) or a control circuit (control unit) (not illustrated), which is configured to generate a signal for driving the sensor based on the signal input from the controller 900. Alternatively, the signal generation circuit or the control circuit can be provided inside a sensor 903b.

In addition, the scanner unit 903 includes a light emission unit (irradiation unit) 903a. The light emission unit 903a includes a light emission element, such as an LED. The light emission unit (the irradiation unit) 903a irradiates the document with light. The sensor 903b receives the light reflected from the document. The image signal is transferred to the controller 900 via the sensor 903b and the A/D conversion unit 903c. The drain (the unnecessary charge elimination unit or the unnecessary charge discharge unit) illustrated in FIG. 6 is connected to a ground of the sensor 903b or the scanner unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
a first photoelectric conversion unit and a second photoelectric conversion unit each configured to convert a received light into a charge;
a charge storage unit configured to store a charge;
a transfer unit configured to transfer the charge to an outside; and
a transport control unit configured to control a first transport for transporting a charge in the first photoelectric conversion unit to the second photoelectric conversion unit, a second transport for transporting the charge in the second photoelectric conversion unit to the charge storage unit and a third transport for transporting the charge in the charge storage unit to the transfer unit,
wherein the transport control unit executes a transport control such that the charge converted in the first photoelectric conversion unit is transported to the charge storage unit after the charge converted in the second photoelectric conversion unit is transported to the transfer unit and before a next light of the received light is irradiated to the first photoelectric conversion unit and the second photoelectric conversion unit.

2. The apparatus according to claim 1, wherein the transport control unit executes the transport control such that the charge converted in the first photoelectric conversion unit is stored in the first photoelectric conversion unit until the charge converted in the second photoelectric conversion unit is transported to the transfer unit by the third transport.

3. The apparatus according to claim 1, wherein the transport control unit executes, after the charge converted in the second photoelectric conversion unit has been transferred to the outside via the transfer unit and before the charge converted in the first photoelectric conversion unit is transported to the charge storage unit by the second transport, an elimination transport for eliminating the charge in the charge storage unit.

4. The apparatus according to claim 3, wherein the charge in the charge storage unit and the charge in the transfer unit are eliminated by the elimination transport.

5. The apparatus according to claim 3, wherein the charge in the second photoelectric conversion unit, the charge in the charge storage unit and the charge in the transfer unit are eliminated by the elimination transport before the charge converted in the first photoelectric conversion unit is transported to the second photoelectric conversion unit by the first transport.

6. The apparatus according to claim 1, wherein the transport control unit executes the elimination transport for eliminating the charge in the charge storage unit after the first photoelectric conversion unit and the second photoelectric conversion unit are irradiated with light and before the charge in the first photoelectric conversion unit and the charge in the second photoelectric conversion unit are transported to the charge storage unit.

7. The apparatus according to claim 1, wherein the transport control unit executes the elimination transport for eliminating the charge in the charge storage unit before the first photoelectric conversion unit and the second photoelectric conversion unit are irradiated with light.

8. The apparatus according to claim 1, further comprising an irradiation control unit for controlling irradiation with light of the first photoelectric conversion unit and the second photoelectric conversion unit, wherein, until each of the charge in the first photoelectric conversion unit and the charge in the second photoelectric conversion unit has been transported by the transport control unit to the charge storage unit after the first photoelectric conversion unit and the second photoelectric conversion unit are irradiated with light, the irradiation control unit executes an irradiation control such that the first photoelectric conversion unit and the second photoelectric conversion unit are not irradiated with the light.

9. The apparatus according to claim 1,
wherein each of the first photoelectric conversion unit and the second photoelectric conversion unit includes a plurality of photoelectric conversion elements arranged in a predetermined direction, and
wherein the charge storage unit includes a plurality of charge storage elements corresponding respectively to the plurality of photoelectric conversion elements arranged in the predetermined direction.

10. The apparatus according to claim 3,
wherein each of the first photoelectric conversion unit and the second photoelectric conversion unit includes a plurality of photoelectric conversion elements arranged in a predetermined direction,
wherein the charge storage unit includes a plurality of charge storage elements corresponding respectively to the plurality of photoelectric conversion elements arranged in the predetermined direction, and
wherein the transport control unit executes the elimination control such that the plurality of charges corresponding respectively to the plurality of photoelectric conversion elements is transported simultaneously to an eliminating unit.

11. The apparatus according to claim 1,
wherein the charge storage unit includes a first storage unit and a second storage unit, and
wherein the transport control unit executes the transport control such that the transport of the charge in the first photoelectric conversion unit from the first storage to the second storage unit after the first photoelectric conversion unit and the second photoelectric conversion unit have been irradiated by light is executed in parallel with a next irradiation with light of the first photoelectric conversion unit and the second photoelectric conversion unit.

12. The apparatus according to claim 1, wherein the transport control unit transports the charge converted in the first photoelectric conversion unit to the second photoelectric conversion unit by the first transport after the charge converted in the second photoelectric conversion unit has been transferred to the outside via the transfer unit.

13. The apparatus according to claim 1, wherein the transport control unit executes the transfer control in a first mode in which the charge converted in the first photoelectric conversion unit is transported to the transfer unit after the charge converted in the second photoelectric conversion unit has been transported to the transfer unit and in a second mode in which the charge in the first photoelectric conversion unit and the charge in the second photoelectric conversion unit are transported to the charge storage unit and then the charge transported to the charge storage unit is transported to the transfer unit by the third transport.

14. A method of controlling an apparatus comprising a first photoelectric conversion unit and a second photoelectric conversion unit each configured to convert a received light into a charge, a charge storage unit configured to store a charge, a transfer unit configured to transfer the charge to an outside, a first transport unit configured to transport a charge in the first photoelectric conversion unit to the second photoelectric conversion unit, a second transport unit configured to transport the charge in the second photoelectric conversion unit to the charge storage unit and a third transport unit configured to transport the charge in the charge storage unit to the transfer unit, comprising:
transporting the charge converted in the second photoelectric conversion unit to the transfer unit, and
transporting, after the transporting the charge converted in the first photoelectric conversion unit to the charge storage and before a next light of the received light is irradiated to the first photoelectric conversion unit and the second photoelectric conversion unit.

15. The apparatus according to claim 1, wherein the transport control unit executes a transport control such that the charge converted in the first photoelectric conversion unit is transported to the charge storage unit by the second transport after the charge converted in the second photoelectric conversion unit is transported to the outside via the transfer unit and before a next light of the received light is irradiated to the first photoelectric conversion unit and the second photoelectric conversion unit.

16. The apparatus according to claim 1, further comprising an irradiation unit.

17. The apparatus according to claim 1, the apparatus includes a scanner.

18. The apparatus according to claim 1, further comprising an image processing circuit configured to execute image processing, and wherein the charge transported from the transfer unit is transferred to the image processing unit.

19. The apparatus according to claim 1, further comprising a printing unit.

* * * * *